United States Patent
Luman (12)

(10) Patent No.: US 6,700,678 B1
(45) Date of Patent: Mar. 2, 2004

(54) METHODS AND SYSTEMS FOR INCREASING THE LIKELIHOOD OF PRINT JOB COMPLETIONS

(75) Inventor: David J. Luman, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/550,537

(22) Filed: Apr. 14, 2000

(51) Int. Cl.[7] ................................................ G06K 15/00
(52) U.S. Cl. ...................................... 358/1.15; 358/1.14
(58) Field of Search .................................. 358/1.1, 1.13, 358/1.14, 1.15, 538, 402, 404, 405; 710/1, 6, 7, 62, 64, 100, 119

(56) References Cited

U.S. PATENT DOCUMENTS 6,529,286 B1 * 3/2003 King ........................ 358/1.14
6,552,813 B2 * 4/2003 Yacoub ...................... 358/1.1

* cited by examiner

*Primary Examiner*—Arthur G. Evans

(57) ABSTRACT

Methods and systems for increasing the likelihood of print job completion are described. In one embodiment, an automated method is described in which a print job is initiated at a first of multiple printing devices that are communicatively linked with one another. The printing devices can be the same type or different types of printing devices. Using the first printing device, the print job is monitored for completion. In the event that the print job is unable to be completed at the first printing device, the printing device automatically attempts to re-route at least a portion of the print job to one or more of the multiple printing devices. In this manner, completion of the print job can be assured with a greater degree of likelihood. Additionally, user messages can be generated by one or more of the printing devices that notify a user that initiated a print job as to the location of the various printed portions of the print job.

20 Claims, 2 Drawing Sheets

METHODS AND SYSTEMS FOR INCREASING THE LIKELIHOOD OF PRINT JOB COMPLETIONS

TECHNICAL FIELD

The present invention relates to methods and systems for increasing the likelihood of print job completion.

BACKGROUND

Often times an individual will have a choice to print a document on one of a number of printing devices that might be connected via a network, such as a company intranet. The individual might simply select an appropriate printer (such as the closest one to them), and send the print job, via their computer, to the printer for printing. If, for some reason, the print job fails (e.g. a paper jam, a toner out condition, or some other problematic operating condition), the individual often does not discover this fact until they attempt to retrieve their print job. When this happens, the individual will typically have to resend the print job to either the same printer (after remedying the operating condition that caused the print job failure), or to another printer. Needless to say, this is undesirable for a number of different reasons. Specifically, having to resend a print job to the same or different printer is inefficient because it wastes printer resources. Additionally, and perhaps more important, resending the print job wastes the time of everyone involved in or affected by the print job failure. For example, for the individual who desires to print the print job in the first place, they must now take the time to resend the print job and gather it when it is done. For others whose print jobs might be sitting in the queue, they may not discover that their print job has not printed until they attempt to retrieve the print job. Accordingly, these individuals will typically have to retry their print jobs or send the print job to another printer.

Additionally, there may be instances when the printed material is voluminous in nature (say for example a 400-page corporate document) and is needed right away. If the initial printer fails, the individual will not typically discover this until they retrieve the document. They must then typically fix the printer and resend the print job, or resend the print job to another printer.

There exists a need to address the above-described problem in a manner that overcomes the inefficiencies that arise when a printing device is unable, for whatever reason, to successfully complete a print job. Accordingly, this invention arose out of concerns associated with addressing the above-described problem.

SUMMARY

Methods and systems for increasing the likelihood of print job completion are described. In one embodiment, an automated method is described in which a print job is initiated at a first of multiple printing devices that are communicatively linked with one another. Using the first printing device, the print job is monitored for completion. In the event that the print job is unable to be completed at the first printing device, the printing device automatically attempts to re-route at least a portion of the print job to one or more of the multiple printing devices. In this manner, completion of the print job can be assured.

In another embodiment, an automated method is described in which a print job is initiated at a first of multiple, network-connected printers. The print job is monitored at the first printer and responsive to the first printer detecting a condition that would prevent the print job from being completed, the first printer contacts one or more of the multiple printers to ascertain whether any of the multiple printers can complete the print job. Responsive to locating a printer that can complete the print job, at least a portion of the print job is initiated at the located printer. A user that initiated the print job is then notified of the various locations of the print job.

In yet another embodiment, a system for increasing the likelihood of print job completion comprises a network and multiple printing devices on which one or more print jobs can be initiated. The printing devices are communicatively linked with one another via the network and individually comprise a processor, one or more computer-readable media, and software code resident on the computer-readable media. The software code is executable on the processor to initiate a print job, contact at least one other of the printing devices to ascertain whether any of the contacted printing devices can complete the print job responsive to a condition that would prevent the print job from being completed on the printing device where the print job was initiated, and initiate at least a portion of the print job at another of the printing devices if the printing device appears to be able to complete the print job.

DETAILED DESCRIPTION

Overview

Figure 1:
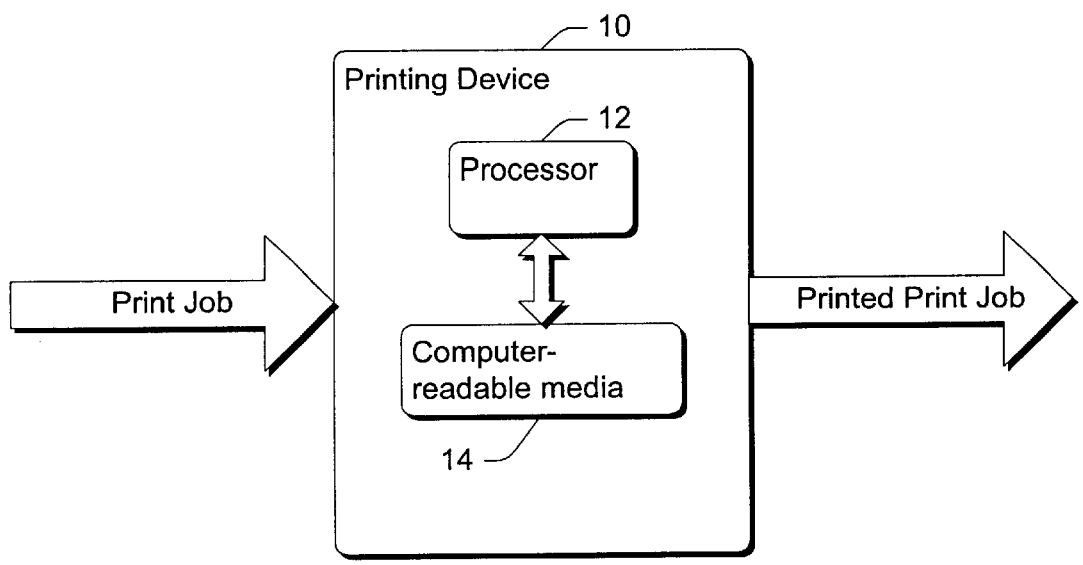
FIG. 1 is a high level block diagram of an exemplary printing device that can be used in connection with the described embodiments.

FIG. 1 shows an exemplary printing device generally at 10. As used in the context of this document, a "printing device" includes any hard copy output device and is intended to include any device that is capable of producing a printed rendering or a hard copy output. Exemplary printing devices include, without limitation, plotters, laser printers, copiers, fax machines, and ink jet printers, to name just a few. Printing devices can include various standalone devices or can comprise part of another device. For example, a printing device might comprise part of a multi-function peripheral (MFP) device. In the described embodiment, an exemplary printing device is described in terms of a printer, such as one of many laser printers that are available from the assignee of this document. This description is not, however, intended to limit the scope of the subject matter claimed in this document.

Characteristics of exemplary printing devices that are suitable for use in connection with the described embodiment are that they generally contain or include a processor 12 of some type, such as a programmable microprocessor, and computer-readable media 14. The computer-readable media can be any suitable computer-readable media such as a storage device (e.g. a hard disk) or memory (RAM and ROM) to name just a few. Typically, software code is embodied on the computer-readable media and contains instructions which, when executed by the processor, implements a particular functionality.

Aspects of the invention include various computer-readable media and printing devices when they are programmed or programmable to implement the functionality described just below.

In the described embodiment, print job completion is ensured, or at a minimum, guaranteed with more precision, through the provision of a system of multiple printing devices. Each of the printing devices is desirably programmable and is programmed to monitor its own operation (e.g. as it progresses through a print job). In the event that the printing device is unable to complete a print job, it is programmed to attempt to re-route a portion of the print job to another of the multiple printing devices. As an aside, it should be appreciated that the multiple printing devices to which print jobs can be re-routed can comprise different types of printing devices. For example, in a network scenario that includes several fax machines and laser printers, if for some reason an incoming fax experiences a problem when it is printing, it can be advantageously re-routed by a fax machine to a laser printer for completion. Accordingly, it is not necessary for a portion of a print job to be re-routed to a similar type of printing device.

Re-routing or attempts to do so advantageously take place automatically, without user intervention. Thus, once a user initiates a print job at a particular printing device, they can rest assured that the print job will likely be completed in the event that difficulties are encountered at the first printing device. Advantageously, one or more of the printing devices is also programmed to generate a notification to the user or individual that initiated the print job. The notification can inform them of the location of their various print job portions. For example, if the first printing device was able to print only the first 100 pages of a 200 page print job, and then had to re-route the print job to a second printing device for completion, the user would receive a notification from the first printing device that indicates that the first 100 pages of the print job can be picked up at a first location corresponding to the location of the first printing device, while the remaining pages can be picked up at a second location corresponding to the location of the second printing device.

Exemplary System

Figure 2:
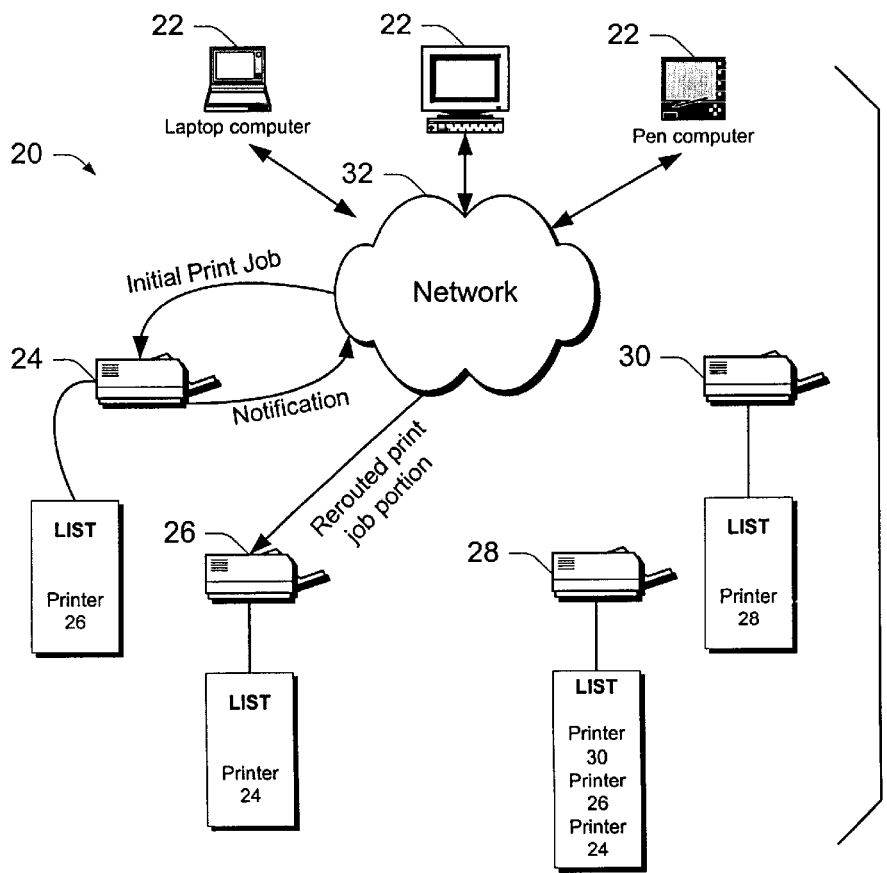
FIG. 2 is a system diagram of a network system that includes exemplary printing devices in the form of printers in accordance with one described embodiment.

FIG. 2 shows an exemplary system 20 in which the various embodiments can be employed. In the illustrated example, system 20 includes one or more computers 22 and multiple printing devices 24, 26, 28, 30. In this particular example, the printing devices all comprise laser printers, but could easily be other different and/or different types of printing devices. It should also be appreciated that computer 22 can comprise different types of computers and computing devices. For example, computer 22 can comprise a laptop computer, workstation, pen computer, and various handheld computers such as palm computers to name just a few.

The computers 22 and printing devices 24–30 are communicatively linked so that they can communicate with one another. In the illustrated example, communication takes place via a network 32 that can be any suitable network that is capable of linking the computers and printing devices together, e.g. LANs, WANs and the like. In addition, the computers and printing devices can be configured to communicate with one another using any suitable hardware, software, firmware or combination thereof (e.g. communication can take place via Blue Tooth technology). Communication can take place using any suitable protocol such as TCP/IP and others. The computers and printing devices can communicate via hard links (such as a wired network) or via any number of wireless ways (e.g. radio frequency (RF), infrared (IR) and the like).

In the illustrated example, when a user initiates a print job, software code executing on the user's computer 22 bundles data together in the form of a print job. The print job contains data and instructions on how to print a particular print job. A print driver on the computer 22 sends the print job to a printing device, via network 32. The printing device receives the print job and begins to process it so that the print job can be executed by the printing device. Those of skill in the art will understand the mechanics of print job processing therefore such is not described here in any more detail.

In the described embodiment, when a printing device receives a print job it initiates the print job in a conventional manner. Throughout the print job the printing device monitors the print job for completion. There are many operating conditions that can affect a print job's completion. For example, the printing device may run out of print media or a paper jam might occur that would prevent the print job from completing. Further, the toner for the printing device might run low, thereby reducing the overall quality of the completed print job. In the described embodiment, each of the printing devices is programmed to monitor its own operation for conditions, such as those mentioned above, that would affect print job completion. Responsive to detecting a condition that would prevent the print job from being completed on the printing device where it was initiated, the printing device is programmed to contact at least one other printing device to ascertain whether any of the contacted printing devices can complete the printing job.

In the described embodiment, the printing device can contact one or more other printing devices any number of different ways. For example, each printing device can contain a list that is saved in memory. The list identifies similar compatible printers (e.g. those with the same, comparable, or better media, print quality etc) on the network. The printing device then contacts each of the identified printing devices to ascertain whether they can complete the print job. Alternately, the printing device can send a message to all printing devices on the network that identifies the print job and various characteristics of the print job. The printing devices that receive the message can then ascertain whether they can complete the print job. The printing devices that received the message then respond to the printing device that sent the message and indicate whether they can complete the print job. Once the original printing device receives the responses, it might select the printing device that is closest in proximity and initiate the remainder of the print job with the selected printing device. In this manner, if the printing device on which the print job was initiated detects a condition that would prevent the print job from completing, it is configured to initiate at least a portion of the print job at another printing device if it appears likely that the other printing device can complete the print job.

It should be appreciated, for purposes of this document, that a print job can fail to be completed if the print job is not able to be physically printed on a particular printing device, and/or if physically completing the print job on the printing device would result in a quality level that is lower than that which was expected by a user when they initiated the print job. For example, if the toner runs low midway through a print job, it may be likely that that the print job could finish, albeit with a drastically reduced quality. However, for purposes of this document, such an occurrence can be deemed as a failure to complete a print job.

Advantageously, if a printing device finds it necessary to re-route a print job to another printing device, a notification is generated for the user that initiated the print job. The notification can indicate to the user the location of the various portions of the print job. Any form of notification and any way of transmitting the notification can be used. For example, a user might receive a notification on their computer in the form of a pop-up broadcast message. Alternately, a user can be paged and receive a message that indicates that their print job has been completed by different printing devices. In the described embodiment, an exemplary notification is an email message that is generated by a printing device and sent, via network 32, to the user. When the user receives the notification, they can retrieve the print job portions from the different locations. Consider also the following scenario: a user is carrying a palm computer and has initiated, a print job from their desk top machine. As they approach the printer to retrieve their print job they notice that a message appears on their palm computer that informs them that a portion of their print job has been re-routed to a different printing device. The message on their palm computer was broadcast by the printing device on which the print job was initiated. The broadcast could be through RF, IR, Blue Tooth, or any other suitable means.

Consider again FIG. 2. There, each of the printing devices is programmed with a list that indicates one or more other compatible printing devices. For example, printing device 24 includes a list that indicates that printing device 26 is compatible with it. Similarly, printing device 26 includes a list that indicates that printing device 24 is compatible with it. Printing device 28 includes a list that indicates that printers 30, 26, 24, and 28 are compatible with it. Printing device 30 includes a list that indicates that printer 28 is compatible with it. When the user initiates a print job on printing device 24, if a problem is encountered at printing device 24, it is programmed to know specific printing devices that it can contact in order to have the print job completed. Thus, printing device 24 would contact print device 26 and, if printing device 26 was able to complete the print job, printing device 24 would re-formulate the print job (perhaps by truncating the print job to send only those uncompleted portions) and send the print job to print device 26 for completion.

Figure 3:
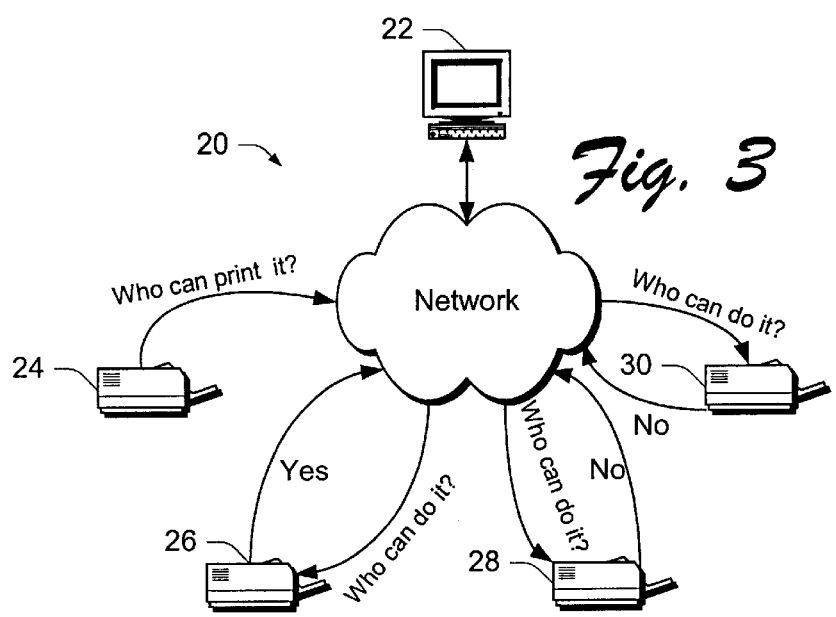
FIG. 3 is a system diagram of a network system that includes exemplary printing devices in the form of printers in accordance with one described embodiment.

As an alternate example, consider FIG. 3. There, each of the printing devices is configured to send a message to all of the other printing devices on the network to ascertain whether they can complete the print job. For example, printing device 24, on which the print job was initiated, might send a "Who can print it?" message out on the network. This message can describe characteristics of the print job that would enable the other printing devices to ascertain whether they can complete the print job. After receiving the messages, the other printing devices can generate and send a response to printing device 24. In the present example, printing device 26 is the only printing device that sends a positive affirmation that they can complete the print job. Accordingly, printing device 24 receives the responses, re-formulates the print job, and sends it to printing device 26 for completion.

It will be appreciated that should a problem be encountered on a printing device to which the print job was re-routed, the printing device is configured to further search for a compatible printing device on which to complete the remainder of the print job. In this case, the notification that is generated for the user might include a message from the second-attempted printing device that indicates where the remainder of the print job might be picked up.

Exemplary Method

Figure 4:
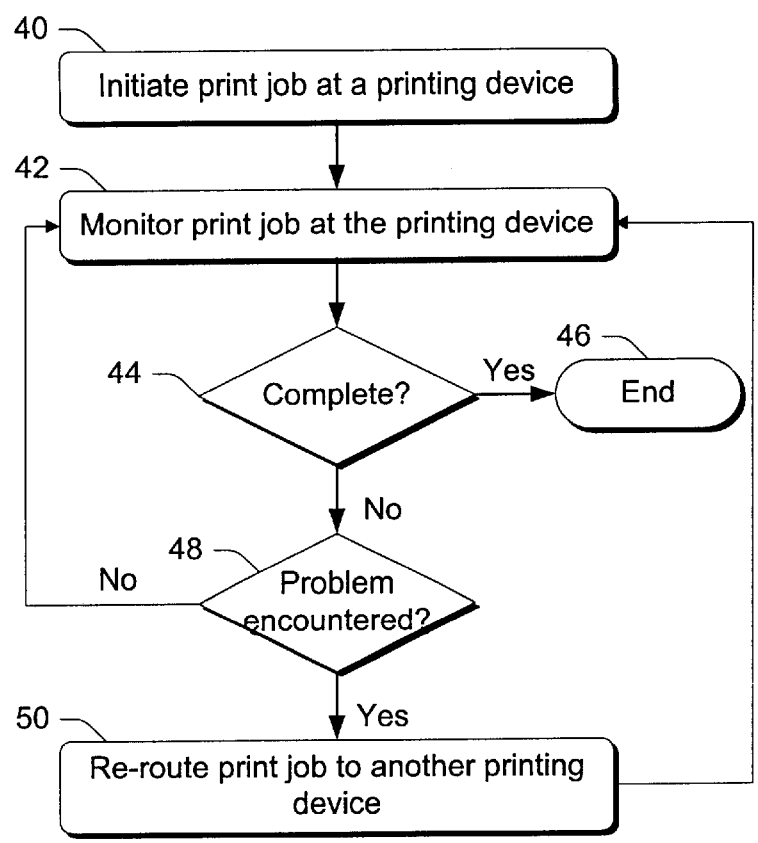
FIG. 4 is a flow diagram that describes steps in a method in accordance with one described embodiment.

FIG. 4 is a flow diagram that describes steps in a method in accordance with one embodiment. The steps that are described by this figure represent steps that are implemented in software or firmware that is resident on each of the individual printing devices of FIGS. 2 and 3. Step 40 initiates a print job at a particular printing device. In the illustrated example, the printing devices comprise network-connected printers, such as laser printers. Step 42 monitors the print job for completion. Step 44 determines whether the print job is complete. If the print job is complete, then the method terminates at step 46. If the print job is not complete, then step 48 determines or detects whether any problems have been encountered with the print job. If no problems are encountered, step 42 continues to monitor the print job. If, on the other hand, any problems are encountered that would prevent the print job from completing, step 50 attempts to re-route the print job to another printing device. In the described embodiment, re-routing attempts take place automatically without the need for user intervention. If the print job is re-routed to another printing device, the method then loops back to step 42 which monitors the print job at the new device. Of course, this subsequent monitoring step is performed by the printing device to which the print job portion was re-routed.

When a print device attempts to re-route a print job, it searches for a suitable printing device on which the print job can be completed. In the examples of FIGS. 2 and 3, this searching takes two different forms. First, the printing device can search for a suitable printing device by consulting a list that is saved in the printing device's memory (FIG. 2). This list describes all of the network-accessible printing devices that can complete the print job. Second, the printing device can search for a suitable printing device by sending a network message to all of the network-accessible printing devices. The network message can query the printing devices to determine which of the printing devices can finish the print job. When the printing devices respond, the original printing device can then take measures to route the print job to the appropriate printing device. The latter approach is advantageous because it is easily extensible and scalable to accommodate new printing devices that might be added to the network. Specifically, once a printing device is added to the network, it would simply be able to receive queries from the other printing devices and would be able, on its own, to ascertain whether it could complete a print job. In the former approach, it is conceivable that one or more of the lists that are maintained by the printing devices would have to be updated. It should also be appreciated that the two described approaches (list-based and message-based) should not be viewed as mutually exclusive. Specifically, a printing device having queried the multiple network printing devices might maintain its own list of suitably compatible printing devices. This might help the printing device in narrowing down the list of possible substitute candidates. This would be particularly useful in the context of a large network with many many printing devices.

It should be appreciated that the two described approaches for searching for a suitable printing device on which to finish a print job are not the only ways to accomplish this task. Accordingly, other ways can be utilized without departing from the spirit and scope of the invention.

One useful feature of the described embodiments is that each printing device is programmed to ascertain, in the event of print job failure, whether other of the network-connected printing devices can complete the print job in accordance with one or more definable parameters. For example, one of the definable parameters can pertain to the quality of the printed print job. For example, a particular printing device on which a problem is encountered may be programmed to initiate a print job at another printing device only if it can be guaranteed that the quality of the print job at the other printing device is the same or better (e.g. the same or higher dots per inch (dpi) or color versus monochrome). Alternately, the printing device might be programmed to accept a lower degree of quality. Another parameter can be one that pertains to resources that are available at the other printing device. Specifically, while another printing device might be configured to process a print job at an acceptable level of quality, it may not have the necessary resources (i.e. print media, toner, etc.) to adequately complete the job. In this instance, the original printing device might choose to use another printing device that might have a lower quality but adequate resources to complete the job.

The various embodiments described above advantageously ensure that once a print job is initiated at a network-connected printing device, it is highly likely that the print job will be completed by a network resource. The printing devices are programmed so that any problems encountered by one of the printing devices is automatically addressed and remedied by the printing devices themselves, without the need for user intervention. Additionally, notifications that are programmed for generation by the printing devices can be sent to the user so that the user is notified of the location of the various print job portions. The described embodiments now make it possible for a user to initiate a print job at the end of the day, and then perhaps go home in the evening knowing that in all likelihood if any printing problems are encountered, they will be automatically addressed and remedied by the printing devices themselves.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. An automated method of increasing the likelihood of print job completion comprising:
    initiating a print job at a first of multiple printing devices that are communicatively linked with one another;
    using the first printing device, monitoring for completion of the print job at the first of the multiple printing devices; and
    automatically attempting, with the first printing device, to re-route at least a portion of the print job to one or more of the multiple printing devices in the event that the print job is unable to be completed at the first printing device.

2. The automated method of claim 1, wherein said automatically attempting to re-route comprises selecting a printing device that appears on a list that is maintained by the printing device.

3. The automated method of claim 1, wherein said automatically attempting to re-route comprises sending a message to one or more other printing devices to ascertain whether any of the other printing devices can complete the print job, and receiving responses from the one or more other printing devices.

4. The automated method of claim 1, wherein said automatically attempting to re-route comprises searching for a suitable printing device until one or more printing devices are found that appear to be able to complete the print job.

5. The automated method of claim 1 further comprising:
    determining how much of a particular print job has been completed by the first printing device; and
    in the event that the print job is unable to be completed at the first printing device, reformulating the print job so that when re-routing is attempted, only the uncompleted portion of the print job is attempted to be re-routed to a second of the multiple printing devices.

6. The automated method of claim 1 further comprising:
    determining whether one or more of the printing devices can print the print job portion in accordance with one or more definable parameters; and
    re-routing the print job portion to the one or more printing devices only if the one or more printing devices can print the print job in accordance with the one or more definable parameters.

7. The automated method of claim 6, wherein one of the definable parameters comprises a parameter that pertains to the quality of a printed print job.

8. The automated method of claim 6, wherein one of the definable parameters comprises a parameter that pertains to whether one or more of the printing devices has enough resources to complete the print job portion.

9. One or more computer-readable media having computer-readable instructions thereon which, when executed by a printing device, implement the method of claim 1.

10. One or more printing devices that are programmed with instructions which, when implemented by the one or more printing devices, implement the method of claim 1.

11. An automated method of increasing the likelihood of print job completion comprising:
    initiating a print job at a first of multiple, network-connected printers;
    monitoring the print job at the first printer;
    responsive to the first printer detecting a condition that would prevent the print job from being completed at the first printer, contacting one or more of the multiple printers, using the first printer, to ascertain whether any of the one or more multiple printers can complete the print job;
    responsive to locating a printer that can complete the print job, initiating at least a portion of the print job at the located printer; and
    notifying a user that initiated the print job of the various locations of the print job.

12. The automated method of claim 11, wherein said notifying comprises each printer on which the print job is initiated and which had to locate another printer to complete the print job notifying the user of a location of the print job.

13. The automated method of claim 11 further comprising:
    determining how much of a particular print job has been completed by the first printer; and
    in the event that the print job is unable to be completed at the first printer, reformulating the print job so that when the print job portion is initiated at the located printer, only the uncompleted portion of the print job is printed.

14. The automated method of claim 11, wherein said notifying comprises generating an email message for the user.

15. One or more computer-readable media having computer-readable instructions thereon which, when executed by a printer, implement the method of claim 11.

16. Multiple network-connected printers that are programmed with instructions which, when implemented by the multiple printers, implement the method of claim 11.

17. A system for increasing the likelihood of print job completion comprising:

a network;

multiple printing devices on which one or more print jobs can be initiated, the printing devices being communicatively linked with one another via the network and individually comprising a processor, one or more computer-readable media, and software code resident on the computer-readable media and executable on the processor, the software code on the printing devices being respectively configured to:

initiate a print job;

contact at least one other of the printing devices to ascertain whether any of the contacted printing devices can complete the print job responsive to a condition that would prevent the print job from being completed on the printing device where the print job was initiated; and initiate at least a portion of the print job at another of the printing devices if the printing device appears to be able to complete the print job.

18. The system of claim 17, wherein at least one of the multiple printing devices is configured to notify a user that initiated the print job of the various locations of the completed print job.

19. The system of claim 17, wherein the printing devices comprise printers.

20. The system of claim 17 further comprising one or more computers operably connected with the network and being configured to utilize one or more of the multiple printing devices to print one or more print jobs.

* * * * *

UNITED STATES PATENT AND TRADEMARK OFFICE
CERTIFICATE OF CORRECTION

PATENT NO.   : 6,700,678 B1
DATED        : March 2, 2004
INVENTOR(S)  : David J. Luman It is certified that error appears in the above-identified patent and that said Letters Patent is hereby corrected as shown below:

Title page, Item [54] and Column 1, line 3,
Title, delete "COMPLETIONS" and insert therefor -- COMPLETION --

Column 5,
Line 17, after "initiated" delete ","

Signed and Sealed this

Fourth Day of January, 2005

JON W. DUDAS
*Director of the United States Patent and Trademark Office*